P. H. SERIO.
COFFEE POT.
APPLICATION FILED NOV. 29, 1916.

1,233,515.

Patented July 17, 1917.

Inventor:
Philip H. Serio
by Davis & Simms
his attorneys

UNITED STATES PATENT OFFICE.

PHILIP H. SERIO, OF ELMIRA, NEW YORK, ASSIGNOR TO NATIONAL ALUMINUM WORKS, OF ELMIRA, NEW YORK, A CORPORATION.

COFFEE-POT.

1,233,515.  Specification of Letters Patent.  Patented July 17, 1917.

Application filed November 29, 1916. Serial No. 134,082.

*To all whom it may concern:*

Be it known that I, PHILIP H. SERIO, a citizen of the United States, and resident of Elmira, in the county of Chemung and State of New York, have invented certain new and useful Improvements in Coffee-Pots, of which the following is a specification.

The present invention relates to coffee pots and more particularly to the type embodying a lower container and an upper receptacle which is supported in an inverted position on the lower container and has its contents held within said receptacle by a removable filter preferably in the form of a piece of textile fabric, an object of this invention being to provide for retaining the fabric on the receptacle as the latter is moved from the lower container, while, at the same time, permitting the filter to be quickly disconnected from the upper receptacle.

To these and other ends, the invention consists in certain parts and combinations of parts all of which will be hereinafter described, the novel features being pointed out in the appended claims.

Figure 1:
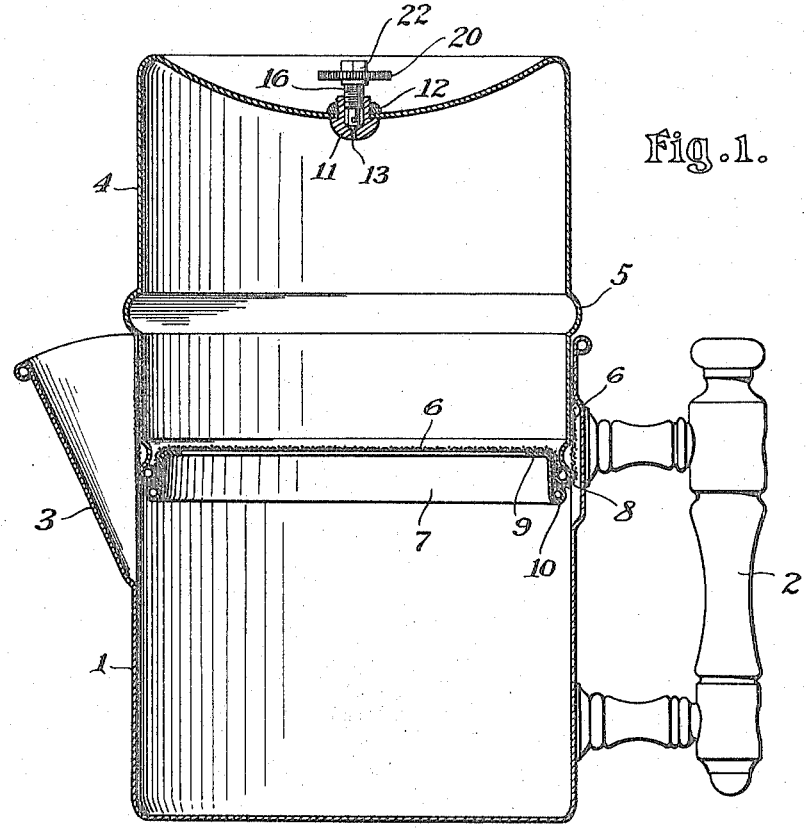
Figure 1 is a vertical section through a coffee pot provided with the present improvement.
Figure 2:
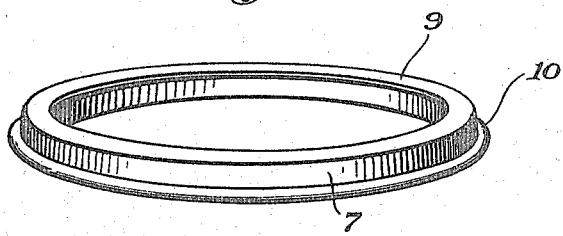
Fig. 2 is a perspective view of the filter retaining ring.
Figure 3:
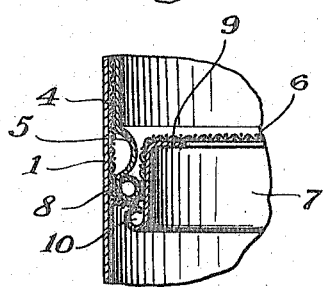
Fig. 3 is an enlarged sectional view showing the manner in which the retaining ring coöperates with the filter.
Figure 4:
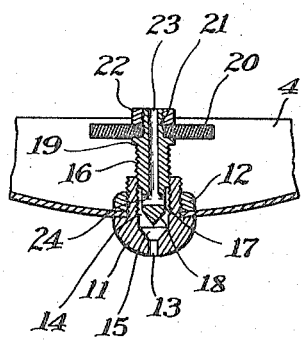
Fig. 4 is an enlarged sectional view through the valve.

Referring more particularly to the drawings, 1 indicates the lower container having a handle 2 and a spout 3. Supported in an inverted position within the top of the container is an upper receptacle 4 adapted to contain the coffee grains. This upper receptacle is provided with a surrounding bulged portion 5 adapted to rest on the upper edge of the container 1 and that portion of the receptacle 4 below the bulged portion 5 lies in close proximity to the inner wall of the receptacle 1. A filter 6, in the form of a piece of a textile material, has its free edges arranged between the outer face of the container 4 and the inner face of the container so as to close the bottom or lower open end of the upper receptacle 4.

With the end in view of holding the filtering cloth against displacement by the contents of the upper receptacle 4 when the latter is removed from the lower container 1, there is provided a retaining ring which is of novel construction. This retaining ring has a tapered portion 7 adapted to fit within the lower beaded end 8 of the upper receptacle 4 to bind the filter cloth. The upper end of this ring 7 is turned inwardly at 9 for the dual function of strengthening the tapered portion and at the same time providing a supporting surface for the filter 6. The lower edge of the retaining ring has an outwardly extending flange or bead 10 which provides a shoulder for limiting the inward movement of the retaining ring. Under normal conditions, the retaining ring will support the filter within the lower end of the upper receptacle 4 while that portion of the strainer which lies between the walls of the upper receptacle 4 and the container 1 acts as a packing to prevent the escape of steam through the space between the receptacle 4 and the container 1. When the receptacle 4 is removed, it is turned upside down and pressure on the filtering cloth through the open portion of the ring 7 causes the ring to be displaced and the filter free.

In coffee pots of this type, it has been customary to provide an air valve in the top of the upper receptacle and it is the purpose of this invention to provide an inexpensive construction for admitting air into the upper receptacle to take the place of the water which drops from the upper receptacle to the lower container. This valve, in this instance, comprises a bushing 11 secured to the top of the upper receptacle 4 by a nut 12. This bushing has a small bore 13 and a larger bore 14 connected to the small bore by a tapered portion 15 which acts as the valve seat. The walls of the larger bore 14 are internally threaded and are engaged by external threads 16 on the valve member which has a reduced cylindrical portion 17 provided with a tapered end 18 for coöperating with the valve seat 15. The valve member also has a flange 19 which forms a seat for the disk 20 made of fiber board or any other suitable nonconductor for heat. This disk surrounds the reduced screw threaded portion 21 on the valve member and is held thereon by a nut 22. A passageway 23 extends longitudinally of the valve member and has lateral outlets 24 in the reduced cylindrical portion 17. When the valve member is adjusted to one limit of its movement as shown in Fig. 1, the bore 13 is closed and when the tapered end 18 is moved away from the seat 15 the valve is open.

What I claim as my invention and desire to secure by Letters Patent is:

1. A coffee pot comprising a lower container, an upper receptacle adapted to fit in an inverted position within the lower container with its lower edge formed with an inwardly-extending bead lying in close proximity to the inner wall of the lower container, a filtering cloth closing the lower end of the upper receptacle and lying with its edges between the outer face of the upper receptacle and the inner face of the lower container, and an open retaining ring for the cloth having a tapered portion adapted to project into the bead at the lower part of the upper receptacle, said ring having an inwardly extending flange at its upper edge to serve as a support for the filtering cloth, and an outwardly extending flange at its lower edge to serve as a shoulder to coöperate with the bead to limit the movement of the ring within the upper receptacle.

2. An upper receptacle for coffee pots having its bottom open and an inwardly-extending bead at its lower end, a filtering cloth, and an open retaining ring for the cloth having a tapered portion adapted to project into the bead at the lower end of the receptacle to secure the filtering cloth, said ring having an inwardly-extending flange at its upper edge to serve as a support for the filtering cloth, and an outwardly-extending flange at its lower edge to serve as a shoulder to coöperate with the bead to limit the movement of the ring within the upper receptacle.

PHILIP H. SERIO.